US008509700B2

(12) United States Patent
Schumacher

(10) Patent No.: US 8,509,700 B2
(45) Date of Patent: Aug. 13, 2013

(54) TEST EQUIPMENT AND MOBILE RADIO DEVICE AND A METHOD FOR TESTING A MOBILE RADIO DEVICE

(75) Inventor: Adrian Schumacher, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 733 days.

(21) Appl. No.: 12/593,091

(22) PCT Filed: Jan. 18, 2008

(86) PCT No.: PCT/EP2008/000389
§ 371 (c)(1),
(2), (4) Date: May 28, 2010

(87) PCT Pub. No.: WO2008/116516
PCT Pub. Date: Oct. 2, 2008

(65) Prior Publication Data
US 2010/0248641 A1      Sep. 30, 2010

(30) Foreign Application Priority Data

Mar. 27, 2007 (DE) .......................... 10 2007 014 692

(51) Int. Cl.
*H04B 17/00* (2006.01)
(52) U.S. Cl.
USPC .................. 455/67.11; 455/426; 455/115.2; 370/252; 370/328; 702/189
(58) Field of Classification Search
USPC ................... 455/67.11, 423, 115.2; 370/252, 370/328; 702/189
See application file for complete search history.

(56) References Cited

U.S. PATENT DOCUMENTS

| 6,208,841 | B1 | 3/2001 | Wallace et al. |
| 6,233,437 | B1 * | 5/2001 | Klenner .................... 455/115.2 |
| 2004/0027994 | A1 * | 2/2004 | Baines ......................... 370/252 |
| 2004/0192214 | A1 * | 9/2004 | Tanaka et al. .............. 455/67.11 |
| 2005/0267715 | A1 * | 12/2005 | Kolu et al. .................... 702/189 |
| 2006/0040654 | A1 * | 2/2006 | Moore et al. ................. 455/423 |
| 2006/0229018 | A1 * | 10/2006 | Mlinarsky et al. ......... 455/67.11 |

FOREIGN PATENT DOCUMENTS

| EP | 0 586 652 B1 | 9/1999 |
| EP | 1 388 966 A2 | 2/2004 |
| EP | 1 696 682 A1 | 8/2006 |
| GB | 2 370 458 A | 6/2002 |
| GB | 2 386 295 A | 9/2003 |
| JP | 08-293840 A1 | 11/1996 |
| JP | 2000-041096 A | 2/2000 |
| WO | WO 00/59250 | 10/2000 |
| WO | WO 2006/047677 A1 | 5/2006 |
| WO | WO 2006/092462 A1 | 9/2006 |

* cited by examiner

*Primary Examiner* — April G Gonzales
(74) *Attorney, Agent, or Firm* — Scully, Scott, Murphy & Presser PC

(57) ABSTRACT

The invention relates to a method for testing a mobile radio device comprising at least one first antenna (9) and a second antenna (10), and to a mobile radio device (2) and test equipment (1). A signal generation unit (5) of the test equipment (1) generates a test signal (27). The test signal is transmitted to a mobile radio device (2) to be tested and is received by the mobile radio device (2) and evaluated. The mobile radio device (2) then generates a response signal (31) and a transmission schedule (30) for transmitting the response signal via the first antenna (9) and/or the second antenna (10) is defined. The response signal (33) is transmitted according to the transmission schedule and received by the test equipment (1). The transmission schedule used is determined by the test equipment. The transmission schedule (36) used is then determined.

9 Claims, 2 Drawing Sheets

Figure 1:
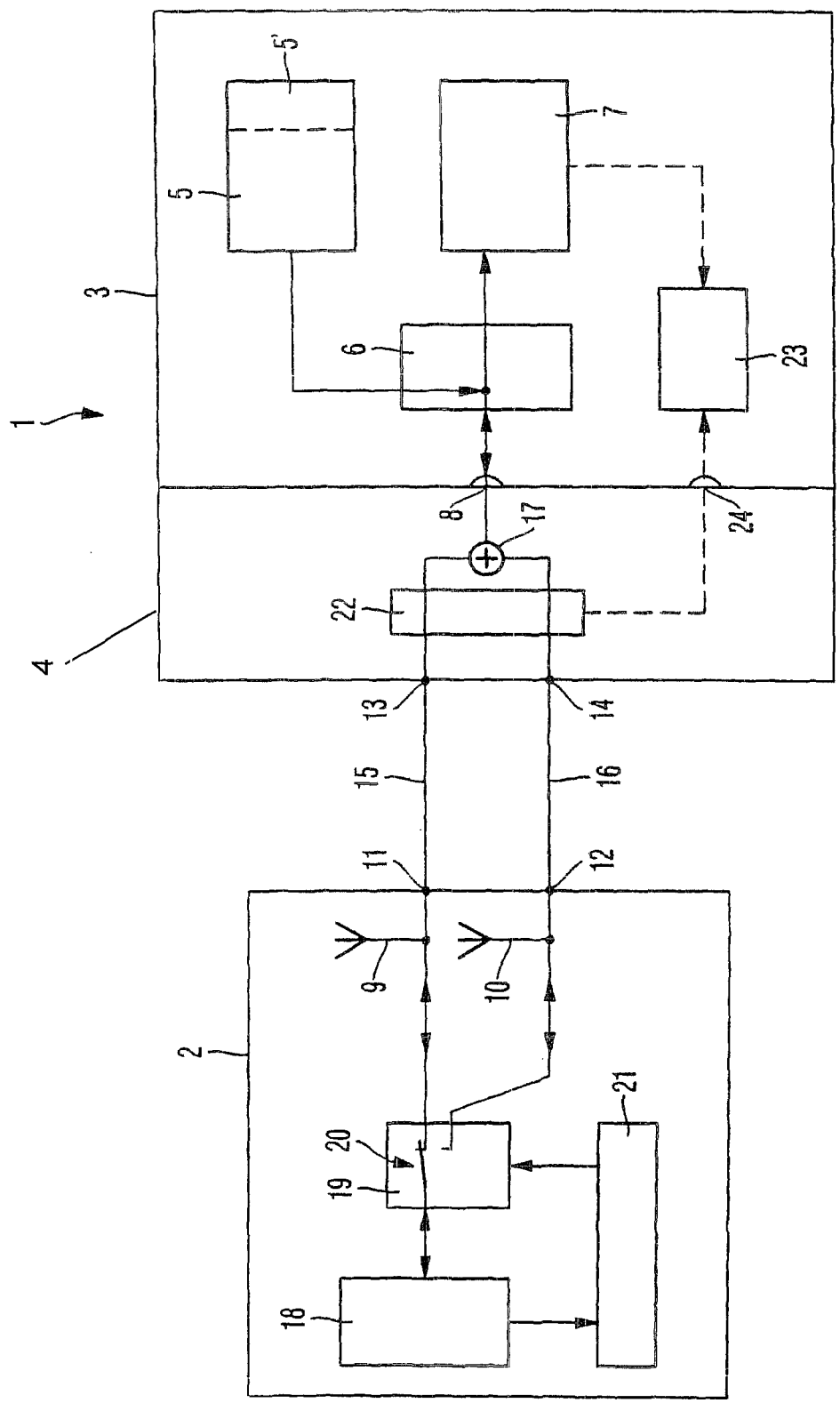

TEST EQUIPMENT AND MOBILE RADIO DEVICE AND A METHOD FOR TESTING A MOBILE RADIO DEVICE

The invention relates to a method for testing a mobile radio device, a corresponding mobile radio device and test equipment.

In the production of mobile radio devices, every completed mobile radio device is checked to monitor its functioning and observance of the specifications. In the context of this check, the mobile radio device is connected to a tester or test equipment. This test equipment emulates a base station. Between the test equipment and the mobile radio device, a connection is therefore set up according to the respectively valid specification. Through this connection, which is generally realised in a cable-bound manner, a test sequence is transmitted to the mobile radio device. This test sequence is worked through in a test loop within the mobile radio device, and a response signal is generated by the mobile radio device, which is transmitted back to the test equipment. In view of the generation of the test signal within the test equipment, a response signal, as retransmitted by the mobile radio device in the ideal case of an error-free processing of the test signal, is known to the test equipment. Accordingly, the test equipment can implement, for example, a bit-error rate determination or a block-rate determination on the basis of the response signal actually received from the mobile radio device by comparison with the anticipated response signal.

In the case of the known test methods, the corresponding test equipment and the mobile radio device, it is disadvantageous that the mobile radio device is connected to the test equipment only via one port. The internal data processing by the mobile radio device can, in fact, be monitored in this manner, however, it is not possible to implement a check of a selected transmission path. Accordingly, a switchover function between several available antennas, which are available to the mobile radio device in the case of a connection, cannot take place. In particular, it is not possible to obtain a correlation between the selection of the antenna used in each case for the transmission and the result of the test.

The object of the invention is therefore to provide a method, corresponding test equipment and a mobile radio device, which allow the selection of an antenna of the mobile radio device used for the transmission to be checked.

The object is achieved by the method according to the invention as specified in the features of claim 1, the test equipment according to the invention with the features of claim 9 and the mobile radio device with the features of claim 12.

In the case of the test method according to the invention, a test signal is generated in test equipment. The test signal is generated by a signal generation unit. This test sequence, for example, a bit sequence, is converted corresponding to a given mobile-radio standard into a test signal to be transmitted. The test signal transmitted in this manner is transferred to the mobile radio device. The test signal is received and evaluated by the mobile radio device. From the evaluated test signal, or at least taking into consideration the evaluated test signal, a response signal is generated by the mobile radio device. Furthermore, the mobile radio device defines a transmission schedule for the transmission of the response signal back to the test equipment, which can also already be pre-set, possibly by the base station or the test device. In this context, the use of a plurality of antennas of the mobile radio device is defined in the transmission schedule. The transmission according to the transmission schedule can accordingly be implemented either via only one of several antennas or jointly via several antennas with a pre-set power and phase distribution.

According to the transmission schedule defined in this manner, the response signal is retransmitted to the test equipment by the mobile radio device. The test equipment receives the response signal and can determine the transmission schedule used by the mobile radio device.

The method according to the invention has the advantage that not only is the evaluation of the content of a test signal transmitted to the mobile radio device checked by evaluating the response signal, but also an internal function of the mobile radio device is monitored by the test equipment. Accordingly, it is possible to check, especially also indirectly, whether an algorithm is implemented in the mobile radio device, which allows a selection from various transmission schedules or respectively the definition of a transmission schedule. With the test equipment according to the invention, a branching device is disposed in the test equipment for this purpose. The branching device is, on one hand, connected to a transmitter/receiver device of the test equipment and, on the other hand, to at least one first port and to a second port. By means of the first port or respectively the second port, a connection to the mobile radio device can be generated. The mobile radio device according to the invention provides correspondingly a first antenna and a second antenna, wherein a separate test port is allocated to each antenna. Accordingly, using a cable connection, the respective antenna port can be connected to a port of the test equipment. Within the test equipment, it can therefore be determined, via which port of the test equipment the response signal has been received.

Advantageous further developments of the method according to the invention and the test equipment and the mobile radio device are specified in the dependent claims.

In particular, it is advantageous that every antenna of the mobile radio device is connected to a port of the test equipment and, from the response signals or signal components received via the individual ports of the test device, the transmission schedule is determined by comparison.

For this purpose, a comparison device is disposed in the branching device of the test equipment. This comparison device is set up in such a manner that the signal components received via the first port or respectively the second port of the test equipment can be compared with one another. This comparison is the basis for determining the transmission schedule of the mobile radio device.

According to a further preferred embodiment, the transmission schedule determined in this manner is buffered by the test equipment. Furthermore, the evaluated response signal is buffered, and, in buffering the determined transmission schedule and respectively the evaluated response signal, items of information are buffered regarding the time allocation of the evaluated response signal and of the transmission schedule. This time linking of the determined transmission schedule and of the evaluated response signal allows the evaluation of the response signal, and accordingly also the method of operation in the definition or respectively selection of the transmission schedule, to be checked with regard to the selected transmission path via one of the antennas available in the mobile radio device.

Moreover, it is advantageous if the mobile radio device can be pre-set by the test equipment regarding which transmission schedule is to be used for the retransmission of the response signal. For this purpose, the test equipment provides a signal generation unit, which, in the case of the generation of the test sequence, pre-sets a transmission schedule, which is to be used by the mobile radio device. With the test signal then transmitted, which contains corresponding items of information regarding the transmission schedule to be used, an instruction is therefore given to the mobile radio device regarding which transmission schedule is to be used for the retransmission of the response signal. For this purpose, the mobile radio device preferably provides a control unit, which is connected to the transmitter/receiver unit and a connection-control unit for controlling the transmission path via the at least first antenna and/or second antenna. Correspondingly, the test equipment provides a signal generation unit with a pre-setting device. The pre-setting device is equipped to pre-set a transmission schedule.

In this context, it is particularly preferred if the determined transmission schedule is determined from the signal components received via the ports of the test equipment.

According to a further preferred embodiment, the signal components, which are received in the test equipment via the individual ports, are combined for the evaluation of the response signal. Accordingly, the entire response signal is used independently of its signal path in the transmission from the mobile radio device to the test equipment, as the basis for determining, for example, a bit-error rate or a block-error rate.

According to a further preferred embodiment, in generating the response signal, an item of information regarding a reception schedule used in the reception of signals of the test signal is generated. On the basis of this response signal, in the evaluation of the received response signal by the test equipment, information can be obtained regarding whether the selection between different transmission schedules in the reception of signals has been implemented correctly by the mobile radio device, and, in particular, as pre-set by the test signal.

Figure 2:
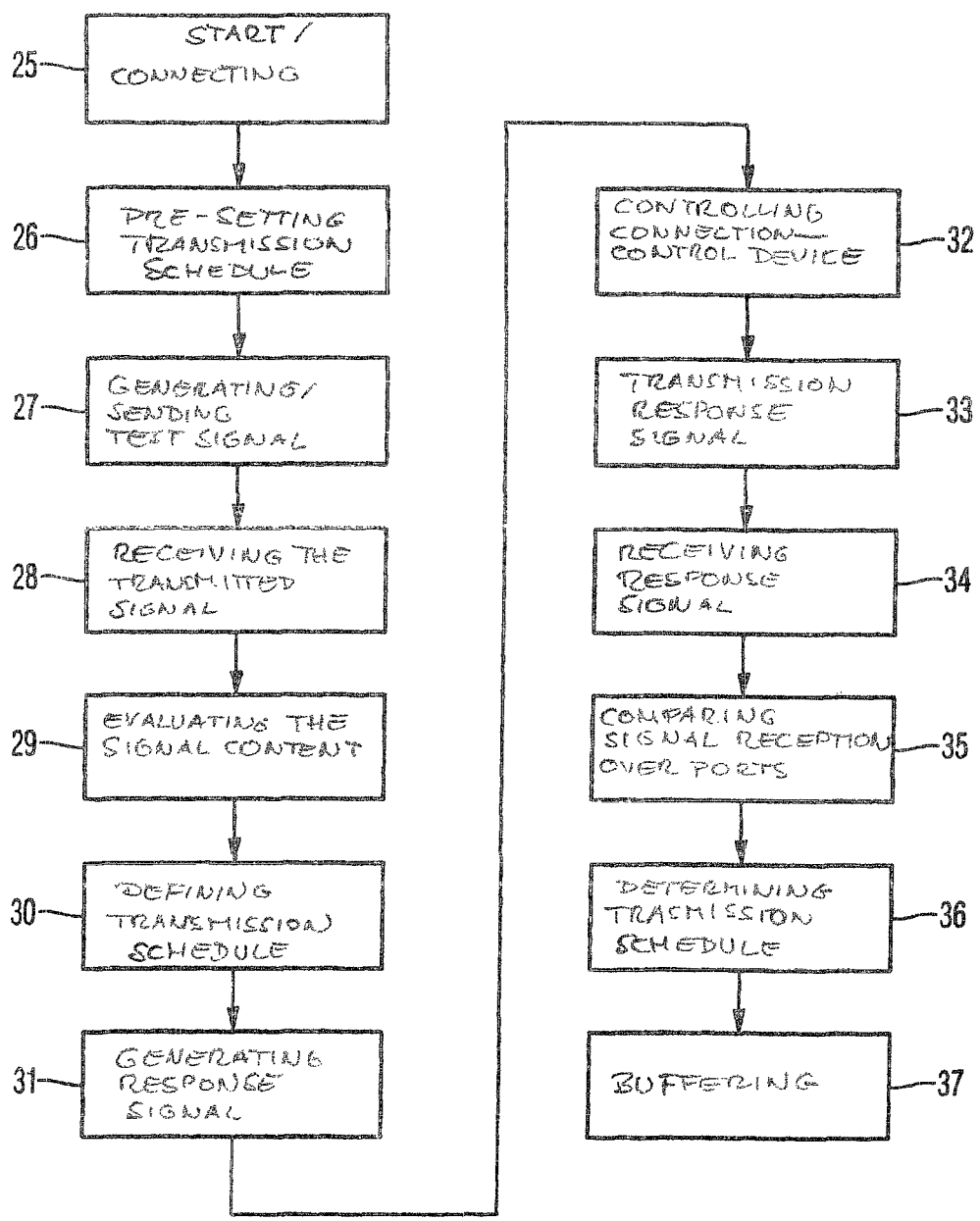

A preferred embodiment of the method according to the invention, of the test equipment and the mobile radio device are presented in the drawings and explained in greater detail in the following description. The drawings are as follows:

FIG. 1 shows a block-circuit diagram of a test set up with test equipment and a mobile radio device; and FIG. 2 shows a schematic presentation for the implementation of the method according to the invention.

For the implementation of the method according to the invention, test equipment 1 and a mobile radio device 2 are connected to one another. The test equipment 1 comprises the actual test device 3 for generating a test signal to be transmitted and for evaluating a response signal retransmitted from the mobile radio device 2. The test device 3 is coupled to a branching device 4. The branching device 4 and the test device 3 can be designed either in the form of two independent devices or in an integrated manner. While in the first case, existing test devices 3 with only one port for a mobile radio device to be tested can be retro-fitted and, in this manner, the switchover function between several antennas of the mobile radio device 2 can be monitored, in the last-named case, in which the branching device 4 is integrated in the test device 3 of the test equipment 1, two ports can be linked for the connection with the corresponding test ports of the mobile radio device 2.

The test device 3 comprises a signal generation unit 5 for the generation of a test sequence. The test sequence consists of a sequence of information, for which a given response of the connected mobile radio device 2 is anticipated. This test sequence is supplied from the signal generation unit 5 of the transmitter/receiver unit 6 and further processed there to form a test signal to be transmitted. The transmitter/receiver unit is connected via a connecting point 8 to the branching device 4. The transmitter/receiver unit is also connected to an evaluation unit 7. In the evaluation unit 7, the response signal sent back by the mobile radio device 2 in response to the test signal is evaluated. For example, a bit-error rate or a block-error rate can be determined from the evaluated response signals. Furthermore, the response to a power adaptation required by the emulated base station, for example, can be measured.

A first antenna 9 and a second antenna 10 are provided in the mobile radio device 2. A test port 11 and respectively 12 in the mobile radio device 2 is allocated to each antenna 9, 10. Before the implementation of the method according to the invention, the first test port 11 is connected to a first port 13 of the test equipment 1, and the second test port 12 is connected to the second port 14 of the test equipment 1. In order to connect the first test port 11 to the first port 13 of the test equipment, a first cable 15 is used. Correspondingly, the second test port 12 of the mobile radio device 2 is connected to the second port 14 of the test equipment 1 via a second cable 16. The cable connection between the test equipment 1 and the mobile radio device 2 ensures that interfering influences, which occur during transmission via the radio path, can be excluded. Another difference from a radio transmission is that the evaluation by the test equipment of the signal components received at the first port 13 or respectively the second port 14 ensures that the transmission path between the mobile radio device 2 and the test equipment 1 can be defined in an unambiguous manner.

A test sequence generated by the signal generation unit 5 is further processed by the transmitter/receiver unit 6 in the manner already described to form a test signal according to a specification of a given mobile-radio standard. This test signal is preferably transmitted equally via the first port 13 and the second port 14 of the test equipment 1 to the mobile radio device 2. The transmission via both cables 15, 16 has the advantage that the correct reception by the mobile radio device 2 is ensured independently of the reception schedule actually used. An erroneous evaluation of the first antenna 9 or the second antenna 10 or respectively of the allocated test ports 11 or 12 by the mobile radio device 2 does not influence the correct supply of the test signal.

The test signal received by the mobile radio device 2 is supplied to the transmitter/receiver device 18 of the mobile radio device 2. This transmitter/receiver device 18 also contains means for evaluating the content of the received test signal. The transmitter/receiver device 18 is preferably connected to the antennas 9 and 10 via a connection-control device 19. The connection-control device 19 controls the connection between the transmitter/receiver device 18 and the first antenna 9 or respectively the second antenna 10, and therefore also the connection of the transmitter/receiver device 18 to the first test port 11 or respectively the second test port 12.

In the simplest case, a transmission schedule is defined by the connection of the transmitter/receiver device 18 to one of the two antennas 9, 10 presented. In such a case, the connection-control device 19 is designed in the form of a switch 20, which connects the individual port of the transmitter/receiver device 18 to the cables leading to the first antenna 9 or respectively the second antenna 10. In this simple case, the transmitter/receiver device 18 is connected respectively only to one of the antennas 9, 10. However, the transmission schedule can also permit a connection to both antennas 9, 10 at the same time. In this case, for example, response signals to be transmitted by the mobile radio device 2 are transmitted both via the first antenna 9 and also via the second antenna 10. Accordingly, the transmission schedule defines with which phases signal components are transmitted via the individual antennas 9, 10 or respectively with which power contents the respective signal components are transmitted via the antennas 9, 10.

In a corresponding manner, a reception schedule is also defined by the transmitter/receiver device 18. In the case of the transmitter/receiver device 18, it is therefore defined, in which manner the signal or signal components received at the two test ports 11, 12 or respectively via the antennas 9, 10 are evaluated.

According to one preferred embodiment, it is defined by the test equipment 1, in which manner the retransmitted response signal is transferred by the mobile radio device 2 via the first test port 11 or respectively the second test port 12. For this purpose, a pre-setting device 5' is provided as a component of the signal generation unit 5 of the test equipment 1. The pre-setting device 5' pre-sets a transmission schedule to be used for the retransmission of the response signal. Taking into consideration the transmission schedule used in this manner, a test sequence is generated by the signal generation unit 5. This generated test signal therefore contains items of information, which can be evaluated by the mobile radio device 2. The test signal transmitted in this manner to the mobile radio device 2 is evaluated by the mobile radio device 2 or respectively by its transmitter/receiver device 18. In evaluating the content of the transmitted test signal, the pre-set transmission schedule to be used is also recognised. A control unit 21 is provided in order to convert this transmission schedule. The control unit 21 is connected to the transmitter/receiver device 18. The control unit 21 is also connected to the connection-control unit 19. On the basis of the evaluated test signal, the control unit 21 defines the transmission schedule for the retransmission of the response signal and controls the connection-control unit 19.

Furthermore, the test equipment 1 provides a comparison device 22. The comparison device 22 is provided in the branching device 4 and is set up in such a manner that signals or respectively signal components incoming via the first port 13 or respectively the second port 14 can be compared with one another. This comparison of the signal component incoming via the first port 13 with the signal component incoming via the second port 14 of the test equipment 1 provides information regarding the test port 11, 12 used at each timing point for the transmission of the response signal, and accordingly the antenna 9, 10 of the mobile radio device 2 used corresponding to the transmission schedule. As already described, the branching device 22 determines the transmission schedule by comparing the signal components of the first port 13 and of the second port 14, and communicates the information regarding the transmission schedule via a second connecting point 24 to a buffer device 23. The buffer device 23 is further connected to the evaluation unit 7. Accordingly, the evaluated response signal is also supplied to the buffer unit 23 by the evaluation unit 7. In buffering the determined transmission schedule and the evaluated response signal, an item of information regarding the time correlation between the determined transmission schedule and the response signal is preferably buffered. This allows inferences to be drawn about events occurring in the response signal relating to the selection of the first antenna 9 or respectively the second antenna 10.

By contrast, the evaluation of the response signal itself is implemented in a uniform manner. That is to say, the signal components, which are supplied to the test equipment 1 via the first port 13 or respectively the second port 14, are combined in a summation point 17 and accordingly supplied combined to the transmitter/receiver device 6 of the test device 3. The evaluation of the response signal regarding bit errors or block errors is therefore evaluated independently of the selected transmission path via the first cable 15 or respectively the second cable 16.

In the exemplary embodiment presented, the use of only two antennas 9, 10 and correspondingly, with a branching device 4 of the test equipment 1, of the two ports 13, 14 is described. However, it is clearly evident that the use of more than two antennas is also possible in a corresponding manner.

The implementation of the method according to the invention is presented once again in the flow chart of FIG. 2. Initially, at the start of the method in step 25, the mobile radio device 2 is connected to the test equipment 1. For this purpose, the first and the second test port 11, 12 of the mobile radio device 2 are connected to the test equipment 1 or respectively its ports 13, 14 via a cable connection. Following this, according to the preferred embodiment, a transmission schedule to be used is pre-set by the pre-setting device 5' (step 26). Taking into consideration this transmission schedule to be used, a test-signal sequence is generated by the signal generation device 5 (step 27). This test sequence is further processed by means of the transmitter/receiver device 6 of the test equipment 1 to form a test signal and transmitted, that is to say, transferred to the mobile radio device 2 (step 28).

The test signal received by the mobile radio device 2 is evaluated (step 29) by the transmitter/receiver device 18 of the mobile radio device 2 and, from the evaluated content of the transmitted test signal, the transmission schedule to be used is determined. The transmission schedule is then defined by the control device 21 (step 30) and the connection-control device 19 is controlled accordingly. Furthermore, a response signal is defined by the transmitter/receiver device 18 of the mobile radio device 2. In the simplest case, this can be the retransmission of a signal of identical content, as is obtained after demodulation and conversion of the sequence obtained in this manner with subsequent modulation. The response signal is now retransmitted according to the defined transmission schedule, that is to say, transferred to the test equipment 1 (step 33). In the simplest case, the transmission is therefore implemented, as has already been explained, either via the first test port 11 or via the second test port 12. Dependent upon the defined transmission schedule, however, a signal component can also be transmitted respectively via both test ports 11, 12. The signal components received in this manner by the test equipment 1, which are supplied via the first port 13 or respectively the second port 14 to the branching device 4, are evaluated jointly by the evaluation unit 7 of the test device 3.

The received signal components of the ports 13 or respectively 14 are further compared with one another (step 35) by the comparison device 22. From this comparison, the transmission schedule defined by the mobile radio device 2 is determined (step 36). The result of the evaluation by the evaluation unit 7 and the determined transmission schedule is buffered in the buffering device 23 (step 37).

In the description of the method, it is assumed that the transmission schedule to be used by the mobile radio device 2 is pre-set a priori in the generation of a test signal by the test equipment 1. However, the method is equally feasible if such a pre-setting of the transmission schedule to be used by the test equipment 1 does not occur. The selection and the definition of a transmission schedule is then implemented by the control unit 21 in the mobile radio device 2.

In a corresponding manner, either by the test equipment 1, the antenna 9 or respectively 10 to be used for the reception of the test signal and accordingly the corresponding test port 11 or respectively 12 can also be defined and communicated via the test signal to the mobile radio device 2. In this case, a response signal, in which the information regarding the reception schedule actually used is contained, is then generated by the transmitter/receiver device 18 of the mobile radio device 2. Through the retransmission of a response signal formed in this manner, an evaluation of the respectively used reception schedule is then also possible in the test equipment 1. However, this evaluation is not implemented by the comparison device 22 but by the evaluation unit 7, in that the content of the retransmitted response signal is analysed there by the evaluation unit 7.

The invention is not restricted to the exemplary embodiment presented. On the contrary, combinations of individual features with one another are also possible.

KEY TO DRAWINGS

FIG. 1
n/a
FIG. 2
25 Start/connect
26 Pre-set transmission schedule
27 Generate/transmit test signal
28 Receive transmitted signal
29 Evaluate signal content
30 Define transmission schedule
31 Generate response signal
32 Control connection-control unit
33 Transmit response signal
34 Receive response signal
35 Compare signal reception via ports
36 Determine transmission schedule
37 Buffer

The invention claimed is:

1. A method for testing a mobile radio device with a plurality of antennas the method comprising:
generating a test signal by a signal generation unit of a test equipment, including a preset transmission schedule, the preset transmission schedule defining a use of the plurality of antennas for a response signal to the test signal;
transmitting the test signal to a mobile radio device to be tested;
receiving the test signal by the mobile radio device;
evaluating the test signal by the mobile radio device;
generating the response signal by the mobile radio device;
transmitting the response signal using one of the plurality of antennas determined based on the preset transmission schedule;
receiving the response signal by the test equipment;
determining a transmission schedule used by the mobile radio device for the response signal by comparing signal components incoming at each of a plurality of ports, wherein the test equipment comprises the plurality of ports, each port in the test equipment being connected to one of the plurality of antennas of the mobile radio device; and
evaluating the received response signal.

2. The method according to claim 1,
wherein
the response signal is evaluated by the test equipment and the determined transmission schedule is buffered by the test equipment, and the evaluated response signal is buffered, wherein, in buffering the determined transmission schedule and/or the evaluated response signal, items of information regarding the time allocation of the evaluated response signal and of the determined transmission schedule are buffered.

3. The method according to claim 1, further comprising comparing the determined transmission schedule with the pre set transmission schedule.

4. The method according to claim 1,
wherein
the signal components received via the plurality of ports of the test equipment are combined for the evaluation of the response signal.

5. The method according to claim 1,
wherein the mobile radio device transmits in the response signal items of information regarding the transmission schedule of the plurality of antennas used for the reception of signals.

6. The method according to claim 1, further comprising:
determining the preset transmission schedule, at a test equipment, for the plurality of antennas in the mobile radio device.

7. Test equipment for testing a mobile radio device, the test equipment comprising:
a signal generation unit and an evaluation unit, which are connected to a transmitter/receiver device, and
a branching device, which connects the transmitter/receiver device to a plurality of ports, each of the plurality of ports being configured to connect to an antenna test port of the mobile radio device, respectively, via a connection cable,
and
wherein the signal generation unit comprises a pre-setting device for pre-setting a transmission schedule, the preset transmission schedule defining a use of a plurality of antennas in the mobile radio device for a response signal to a test signal and wherein a transmission schedule used by the mobile radio device for the response signal is determined by comparing signal components incoming at each of the plurality of ports.

8. The test equipment according to claim 7,
wherein
the branching device provides a comparison device, which is set up for the comparing of signal components received via the plurality of ports.

9. A mobile radio device comprising:
at least one transmitter/receiver device configured to generate a response signal to a test signal; and
a plurality of antennas and a plurality of corresponding test ports, respectively, each of the plurality of antennas is connectable with one of a plurality of ports on a test equipment,
wherein the at least one transmitter/receiver device is connected via a connection-control unit to each of the plurality of antennas,
wherein a control unit is connected to the at least one transmitter/receiver device and the connection-control unit, wherein the response signal is transmitted using one of the plurality of antennas determined based on a preset transmission schedule, the preset transmission schedule defining a use of a plurality of antennas in the mobile radio device for the response signal to a test signal, wherein the at least one transmitter/receiver device is set up in such a manner that through it, a transmission schedule to be used for the response signal can be determined from an evaluated content of the test signal and wherein the transmission schedule used for the transmission of the response signal is determinable by comparing signal components transmitted at the plurality of corresponding test ports.

* * * * *